United States Patent [19]

Hoffman et al.

[11] 4,217,887
[45] Aug. 19, 1980

[54] SOLAR HEAT COLLECTOR WITH INTERLOCKING EXPANDABLE CONSTRUCTION

[76] Inventors: Louie E. Hoffman, 7446 Asman Ave., Canoga Park, Calif. 91307; Douglas M. Warne, 20317 Coulson St., Woodland Hills, Calif. 91367

[21] Appl. No.: 813,919

[22] Filed: Jul. 8, 1977

[51] Int. Cl.$^2$ ............................................... F24J 3/02
[52] U.S. Cl. .................................. 126/448; 165/168; 165/171; 165/173
[58] Field of Search ............... 126/270, 271, 448, 445, 126/450, 444, 442, 432; 237/1 A; 165/143, 144, 174–176, 153; 285/132, 137 R, 156, 176, DIG. 16; 137/271, 608

[56] References Cited

U.S. PATENT DOCUMENTS

| 1,799,436 | 4/1931 | Neuman | 285/330 |
|---|---|---|---|
| 3,239,000 | 3/1966 | Meagher | 126/271 |
| 3,327,945 | 6/1967 | Pfister | 126/285 R |
| 3,396,785 | 8/1968 | Kirsch | 165/175 |
| 3,513,828 | 5/1970 | Masters | 126/271 |
| 3,524,266 | 8/1970 | Hanisco | 34/99 |
| 3,705,622 | 12/1972 | Schwarz | 164/143 |
| 3,859,980 | 1/1975 | Crawford | 126/271 |
| 3,934,323 | 1/1976 | Ford | 126/271 |
| 3,948,247 | 4/1976 | Heilemann | 126/271 |
| 3,976,508 | 8/1976 | Mlavsky | 126/270 |
| 3,996,918 | 12/1976 | Quick | 126/270 |
| 4,024,853 | 5/1977 | Gordon | 126/271 |
| 4,036,207 | 7/1977 | Bouse | 126/271 |

Primary Examiner—James C. Yeung
Attorney, Agent, or Firm—Jessup & Beecher

[57] ABSTRACT

A solar heat collector comprised of modular elements which may be easily assembled and disassembled without any special tools. The system is comprised of a plurality of conduits arranged in a planar fashion for collecting solar heat and joined at their ends by interlocking connectors. The interlocking connectors are elbows and tees which have interlocking male and female flanges which may be easily connected and disconnected. Additional conduits may be added as needed and the length of the conduits may be increased by use of an interlocking coupler. The interlocking nature of the conduits, connectors and couplers allows the entire system to be constructed and disassembled. The interlocking connectors form input and output manifolds through which a heat-collecting fluid may be circulated. An adapter is provided for connecting a pipe for delivering the circulating fluid. The adapter has a neck having a predetermined inner and outer diameter for use with two standard pipe sizes.

6 Claims, 12 Drawing Figures

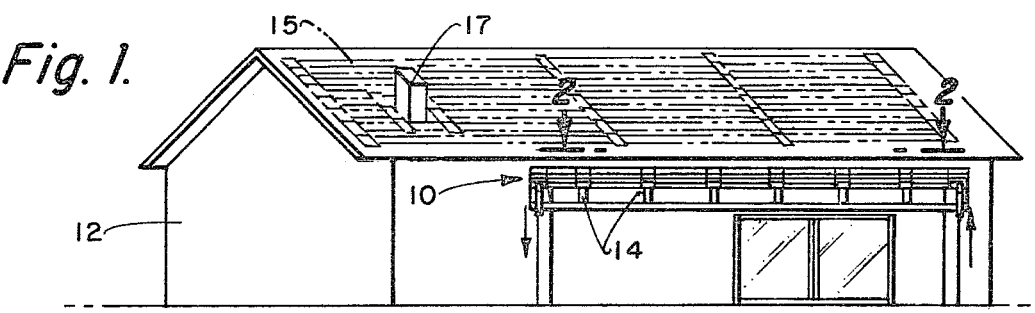
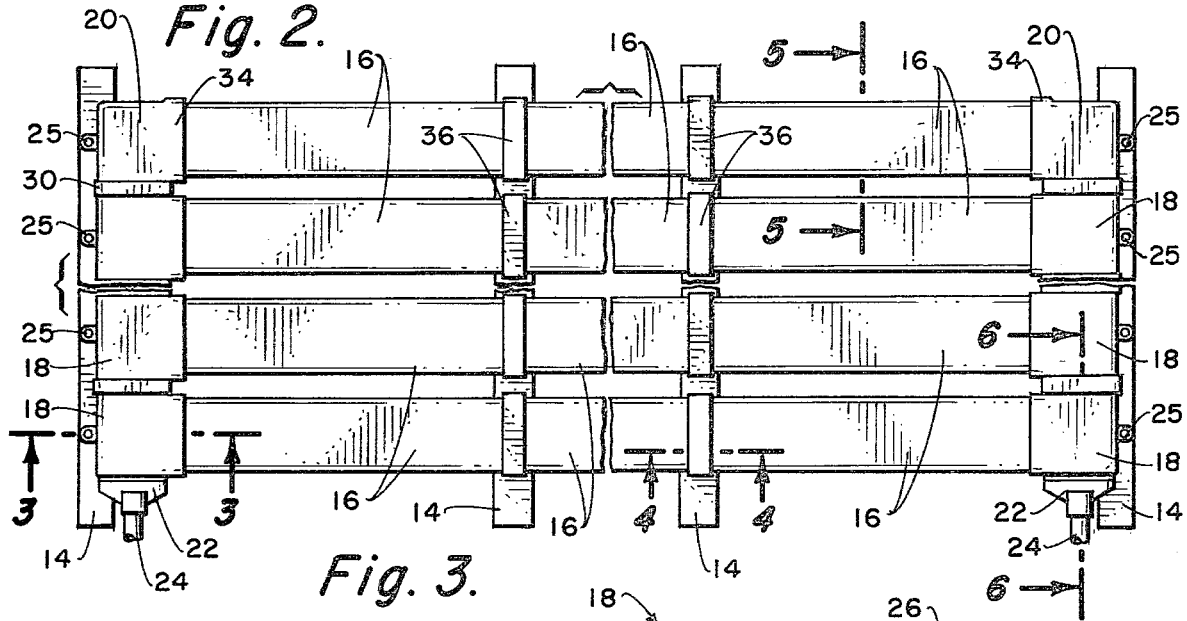
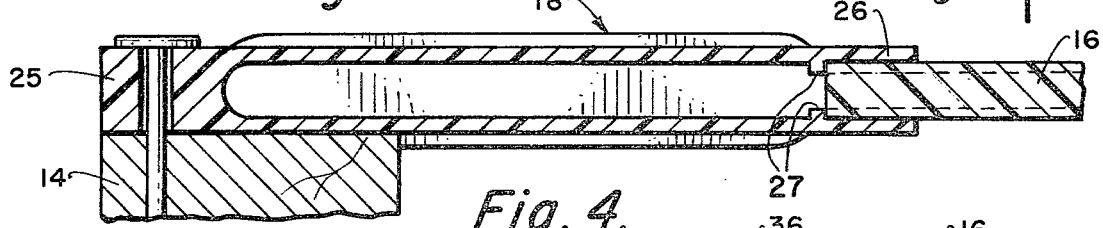
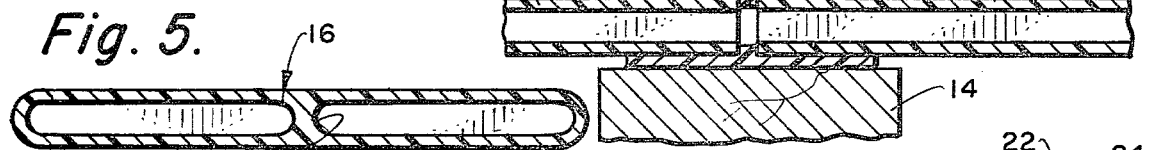
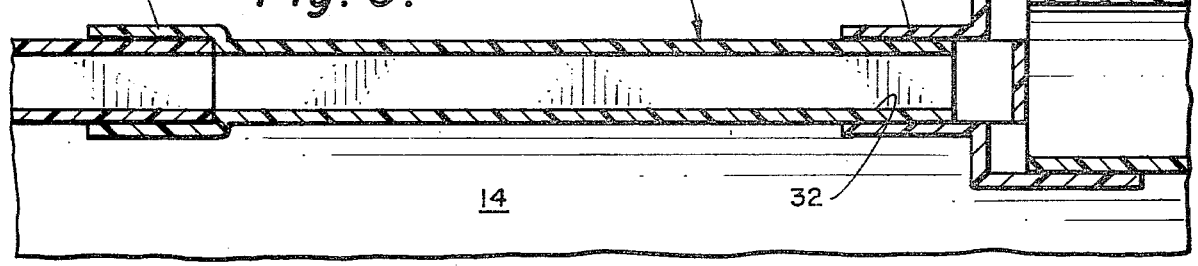

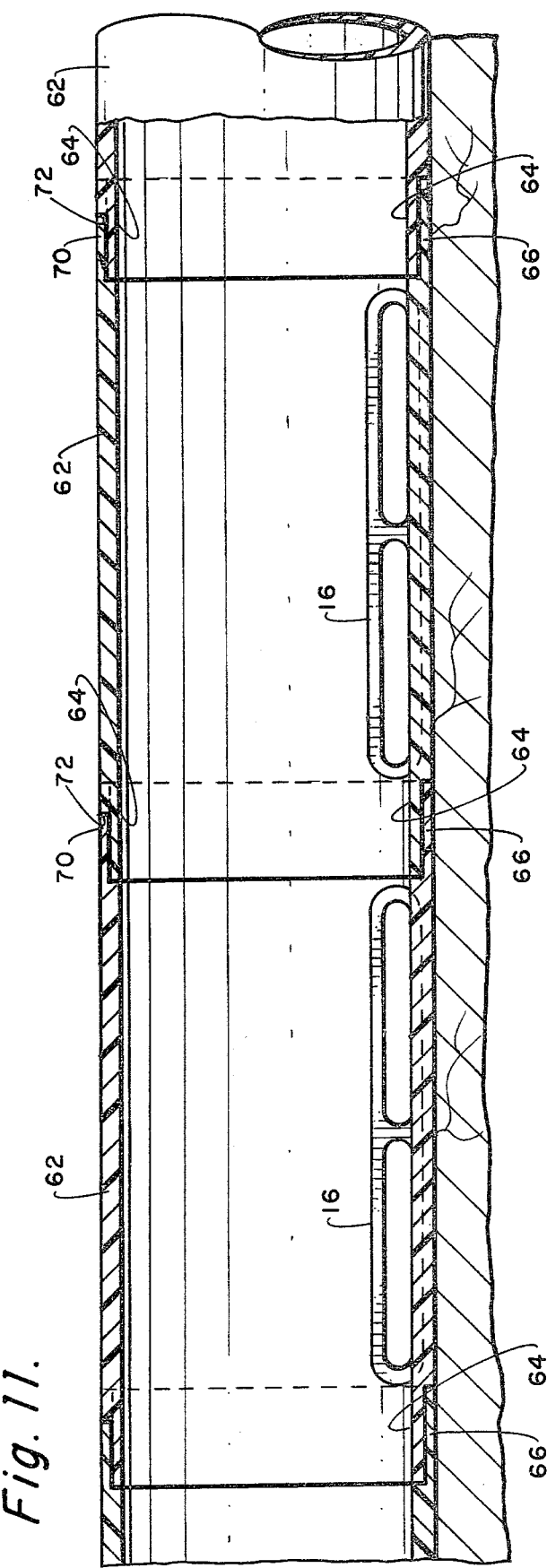
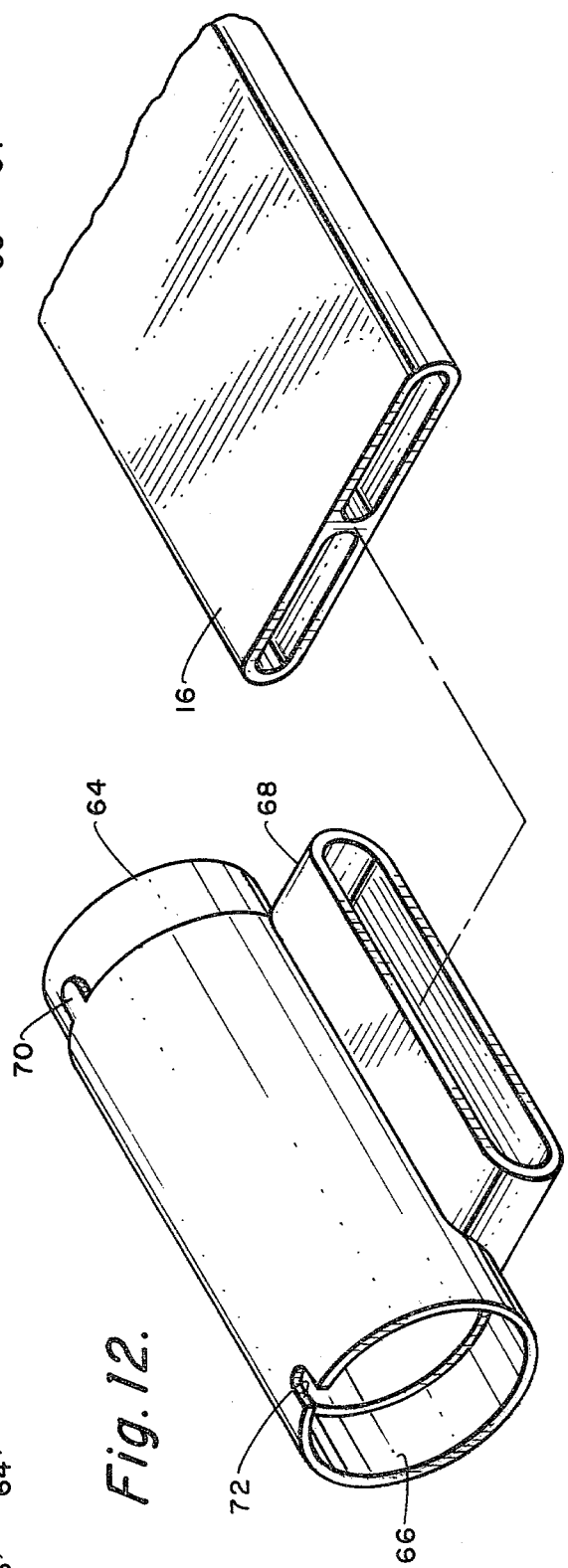

SOLAR HEAT COLLECTOR WITH INTERLOCKING EXPANDABLE CONSTRUCTION

BACKGROUND OF THE INVENTION

This invention relates to solar heat collectors and more particularly relates to solar heat collectors which may be assembled without the use of special fasteners or tools.

In the ever-increasing field of solar heat collectors, most devices are increasingly complex and expensive. Some of these devices consist of large molded panels which may be mounted on a structure, assuming no projections or obstructions are present, through which a heat-collecting fluid may be circulated. Other systems are simply a plurality of pipes mounted on a roof or wall of a building and connected to circulate a heat-collecting fluid. However, these systems, though they appear simple, frequently require the knowledge of plumbing and an experienced plumber or technician to assemble and to repair. Thus, while many systems have been developed to date, they all appear to utilize special materials and require special knowledge and experience for assembly and maintenance. No system known to date is both easy to construct, install and maintain.

SUMMARY OF THE INVENTION

The purpose of the present invention is to provide a system which is simple and easy to install and maintain.

The system is comprised of a plurality of flat or planar conduits which are connected by interlocking tees and elbows through which a heat-collecting fluid is circulated. Interlocking couplers permit the system to be expanded in length by adding sections of the flat conduits. The interlocking nature of the tees and elbows connecting adjacent conduits permits the system to be easily expanded in width to accommodate any structural surface area contrary to conventional systems which require continuous support under each panel. Each of the members for interlocking adjacent ends of pipes or adding sections of pipes can be provided with a fastening hole for nailing or otherwise securing the system to a structure. The interlocking connectors form input and output manifolds through which a heat-collecting fluid may be circulated. Adapters allow the connecting of pipes for delivery of the circulating fluid. The adapters have a flange for interlocking with the manifold and a neck portion having a predetermined inner and outer diameter selected to accommodate two standard pipe sizes.

One object of the present invention is to provide a solar heat collector which is easy to assemble and install.

Another object of the present invention is to provide a solar heat-collecting system which may be assembled without special tools or fasteners.

Yet another object of the present invention is to provide a solar heat collector which may be expanded easily to accommodate any surface area of a structure.

Other objects, advantages and novel features of the invention will become apparent from the following detailed description of the invention when considered in conjunction with the accompanying drawings wherein like reference numbers identify like parts throughout.

BRIEF DESCRIPTION OF THE DRAWINGS

FIG. 1 illustrates one method of installing the system of the invention on a structure.
FIG. 2 is a view of the system taken at 2—2 of FIG. 1.
FIG. 3 is a sectional view taken at 3—3 of FIG. 2.
FIG. 4 is a sectional view taken at 4—4 of FIG. 2.
FIG. 5 is a sectional view of the conduit of the invention taken at 5—5 of FIG. 2.
FIG. 6 is a sectional view taken at 6—6 of FIG. 2.
FIG. 11 is a sectional view taken at 11—11 of FIG. 9.
FIG. 12 is an exploded view illustrating the assembly of the variation of the invention shown in FIG. 9.

DETAILED DESCRIPTION OF THE PREFERRED EMBODIMENT

Figure 7:
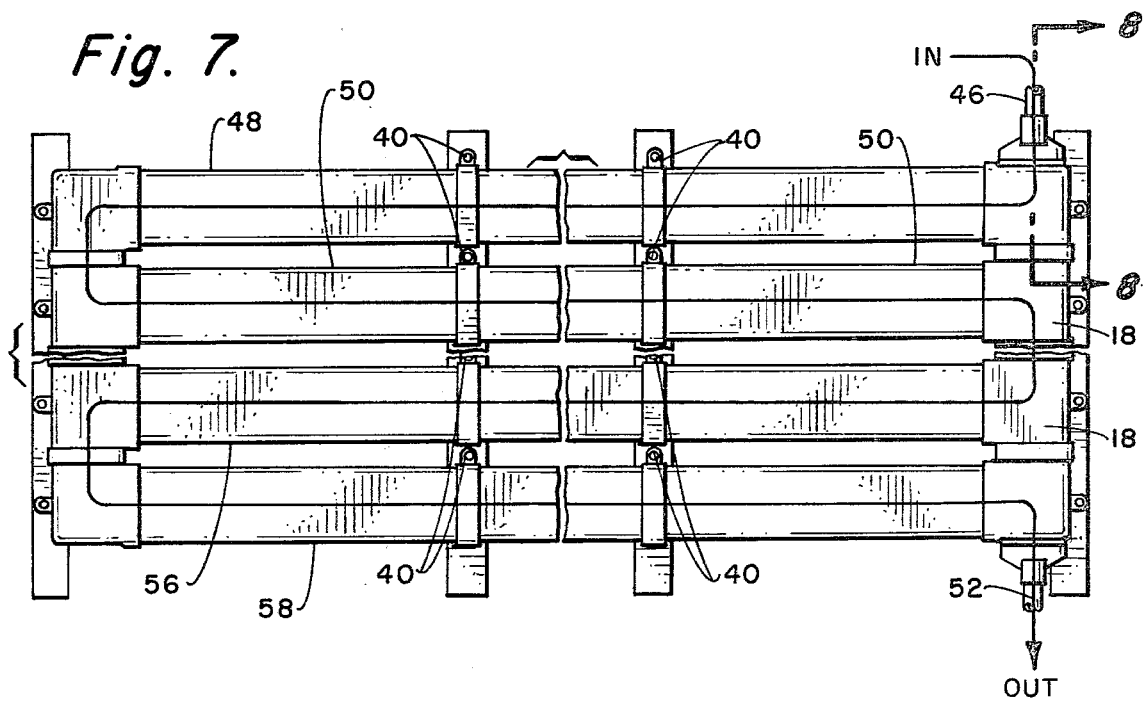
FIG. 7 is a view of the system similar to FIG. 2 illustrating another embodiment.

Referring to FIG. 1, the solar heat-collecting system 10 is illustrated in use as a lattice-work roof structure of a patio cover for a building 12. The heat-collecting system 10 is attached to the beams 14 to provide a lattice-work cover for a patio. Obviously the system may also be mounted on the wall or roof of a structure, if desired.

The details of the system are illustrated in FIG. 2. In this figure substantially flat individual conduits 16 having an oval cross-sectional shape, through which a heat-collecting fluid circulates, are connected at their ends by tees 18 and elbows 20. The tees and elbows are constructed to interlock with the conduits 16 and with each other. Thus, the solar heat-collecting system can be constructed one section at a time and expanded both in length and width as needed. Adapters 22 connect pipes 24 for delivery of a heat-collecting fluid to the system.

One type of interlocking tee is illustrated in FIG. 3, which is flat in appearance and has an oval cross-sectional shape matching the shape of the pipes 16. This tee is comprised of a female flange 26 fitting snugly over the conduit 16. Each tee 18 has a fastening hole which may be provided by a molded ear 25 on the opposite end from the conduit flange 26. Each tee also has a male flange 32 and a female flange 30 (FIG. 6) for interlocking successive tees for adding additional sections of conduits 16 to expand the system to any width desired. The elbows 20 have female flanges 34 engaging the conduit 16 and a male flange for engaging the female flange 30 of an adjacent tee. A shoulder 27 in the flange 26 abuts the end of conduit 16 to act as a limiting stop.

Sections of conduit 16 may also be added by using couplers 36 as illustrated in the sectional view of FIG. 4. The couplers 36 snugly fit over abutting ends of two conduits 16. This allows the entire heat-collecting system to be expanded easily to any length and simplifies the manufacturing of the conduits 16. They may then be manufactured to predetermined standard lengths. Conduit may be cut to any length desired.

The flat or planar conduit 16 is shown in detail in FIG. 5 and is comprised of a flat enclosure having one or more stiffening ribs 38. This conduit may be constructed of a heat-absorbing material, such as a plastic, which is pigmented to provide a blackbody surface. The tees 18, elbows 20 and couplers 36 would also be comprised of a heat-absorbing material. Molded ears 25 can be provided on the tees 18 and elbows 20 for securing the system to a structure with nails or other standard fasteners, if desired.

The manifold adapters 22 are shown in detail in FIG. 6. They are provided with a female flange 42 engaging the male flange 32 of a tee 18. The adapter has a neck 44 with a predetermined internal and external diameter for using two different size pipes 24. One size pipe can fit the internal diameter of neck 44, while if greater flow is desired, a larger diameter standard pipe would fit over the external diameter of the neck 44. Thus, the manifold adapter 22 permits the use of this system with two different standard pipe sizes.

An alternate construction for the tees 18 is illustrated in FIGS. 9 through 12. In this embodiment the tees 62 in the direction of the male and female connections 64 and 66, respectively, have a circular or tubular (FIG. 12) rather than a flat cross-section with a flat oval flange 68 for pipe 16 connecting. The flange 68 is offset from the axis and tangentially intersects the diameter or circumference of the circular cross-sectional portion of the tees 62 which facilitates assembling the system to lie flat on a flat surface without any sag. Further, as in the embodiment of FIG. 3, a shoulder 67 is provided as a stop and to seal the end of the conduit 16. A tee in this configuration has some advantages in coupling to standard pipe sizes and improving bonding of male and female connections. With this type of tee a key 70 and a notch 72 provided in the male and female ends 64, 66, respectively, automatically assures alignment of the flanges 68, as shown in FIG. 11. For more permanent installations a resin adhesive would be used, but if portability is desired, then these tees are advantageous because hose clamps could be used at the joints permitting disassembly. Mounting ears 74 for securing to a beam 78 with a nail 76 or other standard fastener can be provided, if desired.

In the system illustrated in FIG. 2, a pump (not shown) circulates heat-collecting fluid by delivering it to one end of the collector 10 for flow to the conduit 16 to the opposite end and out through the second pipe 24. Thus, the heat-collecting fluid makes only one pass through the solar collector and then exits at the opposite end. However, it may be desirable to circulate the fluid across and back through the conduit 16 to maximize the heat-collecting potential. For this purpose the system may be constructed as illustrated in FIG. 7.

In the embodiment illustrated in FIG. 7, some of the tees 18 would be blocked off at one end, for example by a plug 19, causing the fluid to be directed back to the adjacent conduit until it flows through a circuitous path out the other end of the system. In this system the input conduit pipe 46 receives the heat-collecting fluid, which flows to the left through the first set of heat-absorbing conduits 48, and then back across the system through a second set of heat-collecting conduits 50. The heat-collecting fluid then continues this circuitous path until it reaches the return pipe 52.

Figure 8:
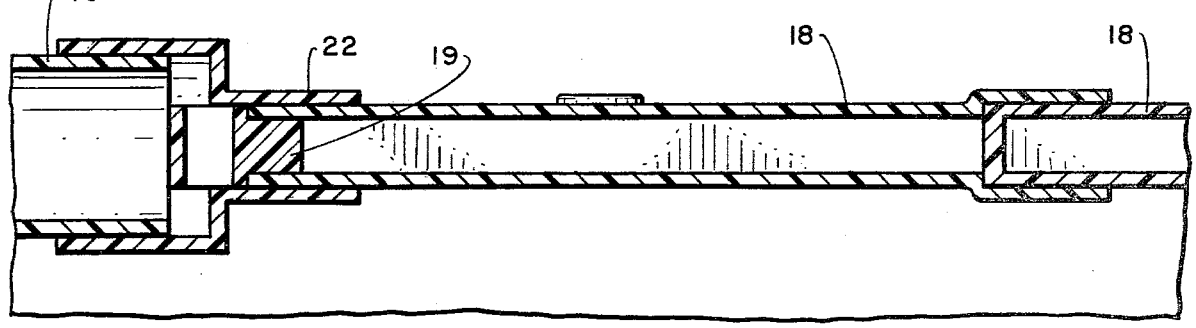
FIG. 8 is a sectional view taken at 8—8 of FIG. 7.

To provide this type of path, the tees 18 would be constructed as illustrated in the sectional view FIG. 8. Here the input pipe 46 delivers a fluid to manifold adapter 22 and then to a tee 18 for circulation through the first conduits 48. The fluid is prevented from flowing into the adjacent tee by having one end blocked off as shown at 54. The design can be varied to vary the path of circulation as desired. For example, the blocking web 54 could be in the third tee permitting flow through conduits 48 and 50 in a first direction across the collector and then flow through a second pair of conduits 56 and 58 back to the opposite end of the collector to the return pipe 52. These variations would be determined by the amount of fluid, temperature and other variables. Thus, the fluid can be made to flow in any direction and in any manner through the solar heat collector merely by blocking off certain portions to permit various modifications for climate and other conditions.

Figure 9:
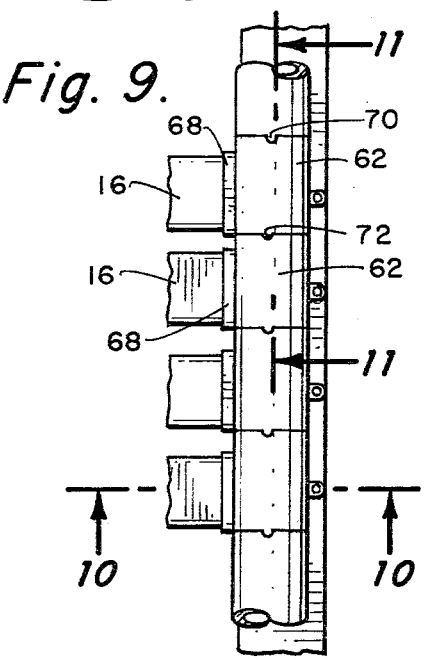
FIG. 9 is a partial section illustrating a variation of the invention.
Figure 10:
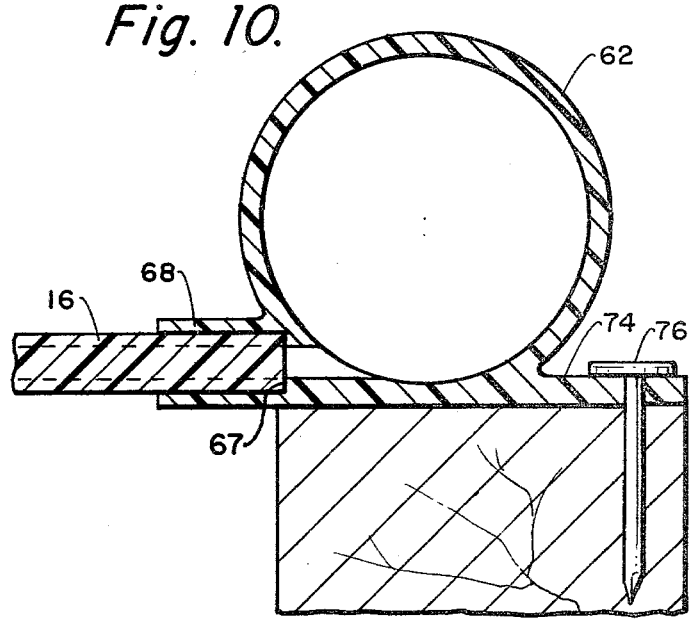
FIG. 10 is a sectional view taken at 10—10 of FIG. 9.

The system is easily adaptable to any flat surface of a structure having a substantial exposure to the sun, such as a roof or wall, in addition to its use as a patio cover. To increase the support of the system for a variety of uses, mounting ears 40, as shown in FIG. 9, could be provided on the couplers 36 in a manner similar to that shown on the tees 18, if desired. A suggested roof installation is shown in phantom at 15 in FIG. 1, built around an obstruction, such as a chimney 17.

The system described is advantageous because it can be easily assembled, installed and expanded both in length or width as desired. Further, it has the distinct advantage of being used in a number of different fashions. As illustrated in FIG. 1, it can be used as the lattice roof for a patio covering with the underside painted or decorated as desired. The ease of assembly, installation and expansion of this system makes it ideal for use in a limitless number of applications. Further, the solar heat collector has such versatility that it may be constructed to conform to any flat surface of a structure of any width or length. Obstructions, such as vent pipes and chimneys, may be easily accommodated by adding a straight coupler in the header at both ends and omitting one or more sections of pipe. On the other side of the obstruction a tee would be added and additional sections of pipe continued, utilizing the maximum amount of structural surface available.

Obviously, many modifications and variations of the present invention are possible in light of the above teachings. It is therefore to be understood that the full scope of the invention is not limited to the details disclosed herein and may be practiced otherwise than as specifically described.

What is claimed is:

1. In a system for collecting solar heat energy in which a heat-absorbing fluid is circulated, an assembly comprising:

a plurality of heat-absorbing substantially flat conduits having an oval cross-sectional shape;

a plurality of interlocking tee means having a tubular cross-sectional shape interlocking adjacent ends of said flat conduits into a lattice work assembly;

said interlocking tee means having a male flange on a first end and a female flange on a second end for connecting adjacent interlocking tee means and a female flange between the ends fitting over said flat conduits whereby said interlocking tee means form input and output manifolds;

said female flange intersecting said tubular interlocking tee means substantially tangent to the circumference; and adapter means for connecting said manifolds to circulating means for circulating a heat-absorbing fluid.

2. The system according to claim 1 wherein said adapter has a neck having an interior and exterior diameter adapted to permit use of two different standard pipe sizes.

3. The system according to claim 1 including:

interlocking coupling means for interlocking ends of said conduits to increase the length of said system to accommodate the available structural area available.

4. The system according to claim 1 including interlocking alignment means on said male and female flanges whereby abutting interlocking tees are automatically aligned.

5. The system according to claim 1 including fastening means in the form of ears formed on said interlocking means for fastening said system to a surface.

6. The system according to claim 1 wherein said female flange includes an internal shoulder abutting the end of said conduit acting as a limiting stop to seal said conduits.

* * * * *